US006851192B2

(12) United States Patent
So

(10) Patent No.: US 6,851,192 B2
(45) Date of Patent: Feb. 8, 2005

(54) PASTRY CUTTER

(76) Inventor: Kwok Kuen So, 2nd Floor, Chuan Yuan Factory Building, 342-344 Kwun Tong Road, Kwun Tong, Kowloon (HK)

( * ) Notice: Subject to any disclaimer, the term of this patent is extended or adjusted under 35 U.S.C. 154(b) by 4 days.

(21) Appl. No.: 10/386,564

(22) Filed: Mar. 13, 2003

(65) Prior Publication Data
US 2003/0172815 A1 Sep. 18, 2003

(30) Foreign Application Priority Data
Mar. 14, 2002 (GB) .............................................. 0206035

(51) Int. Cl.[7] .............................................. A21C 11/10
(52) U.S. Cl. .......................................... 30/306; 30/299
(58) Field of Search ........................ 30/306, 299, 130; D7/672, 675; 99/426

(56) References Cited

U.S. PATENT DOCUMENTS

| 925,919 | A | * | 6/1909 | Kimmel | 30/306 |
|---|---|---|---|---|---|
| 1,382,677 | A | * | 6/1921 | Schmitz | 30/306 |
| 1,615,569 | A | * | 1/1927 | Christensen | 30/306 |
| 1,727,747 | A | * | 9/1929 | Carney | 30/306 |
| 1,727,748 | A | * | 9/1929 | Carney | 30/130 |
| 1,855,663 | A |  | 4/1932 | Bregman |  |
| 2,007,768 | A | * | 7/1935 | Olevin | 30/306 |
| 2,818,645 | A | * | 1/1958 | Martin | 30/306 |
| 3,089,238 | A | * | 5/1963 | Przybylowicz | 30/130 |
| 3,880,030 | A |  | 4/1975 | Rosengren |  |
| D283,964 | S | * | 5/1986 | Shun | D7/675 |
| D284,061 | S | * | 6/1986 | Shun | D7/675 |
| 4,671,759 | A |  | 6/1987 | Hayashi et al. |  |
| 5,600,870 | A | * | 2/1997 | Fields et al. | 16/342 |
| D477,179 | S | * | 7/2003 | So | D7/393 |

FOREIGN PATENT DOCUMENTS

| CH | 250648 | * | 5/1947 |
| DE | 35 22 753 A1 |  | 1/1987 |
| DE | 295 09 301 |  | 12/1995 |
| EP | 1 099 379 A2 |  | 5/2001 |
| EP | 1344456 | * | 9/2003 |
| GB | 2 174 033 A |  | 10/1986 |
| GB | 2 357 989 |  | 7/2001 |

* cited by examiner

Primary Examiner—Stephen Choi
(74) Attorney, Agent, or Firm—Leydig, Voit & Mayer, Ltd.

(57) ABSTRACT

A pastry cutter comprising a rotor having a central axis and a periphery around the axis, a handle supporting the rotor for rotation about the axis, and a plurality of cutting moulds individually connected to the periphery at equi-angular positions around the axis. Each cutting mould comprises a generally flat cup-shaped body having a cutting rim and includes a stem connecting the body to the periphery in a spaced apart relationship therefrom and in a substantially radial direction with respect to the central axis, such that the bodies lie in an annular arrangement around the rotor, with their cutting rims facing outwards. Each stem has an outer end connected to the corresponding body and an inner end releasably connected to the periphery.

15 Claims, 7 Drawing Sheets

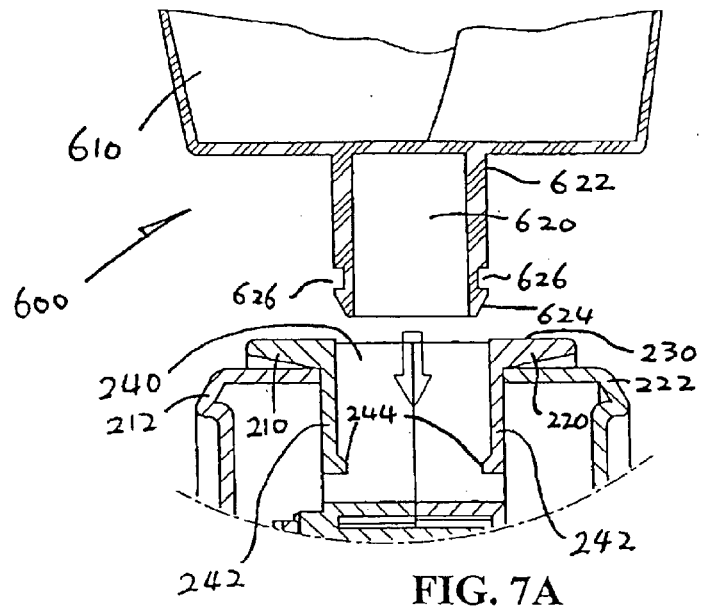
FIG. 7A
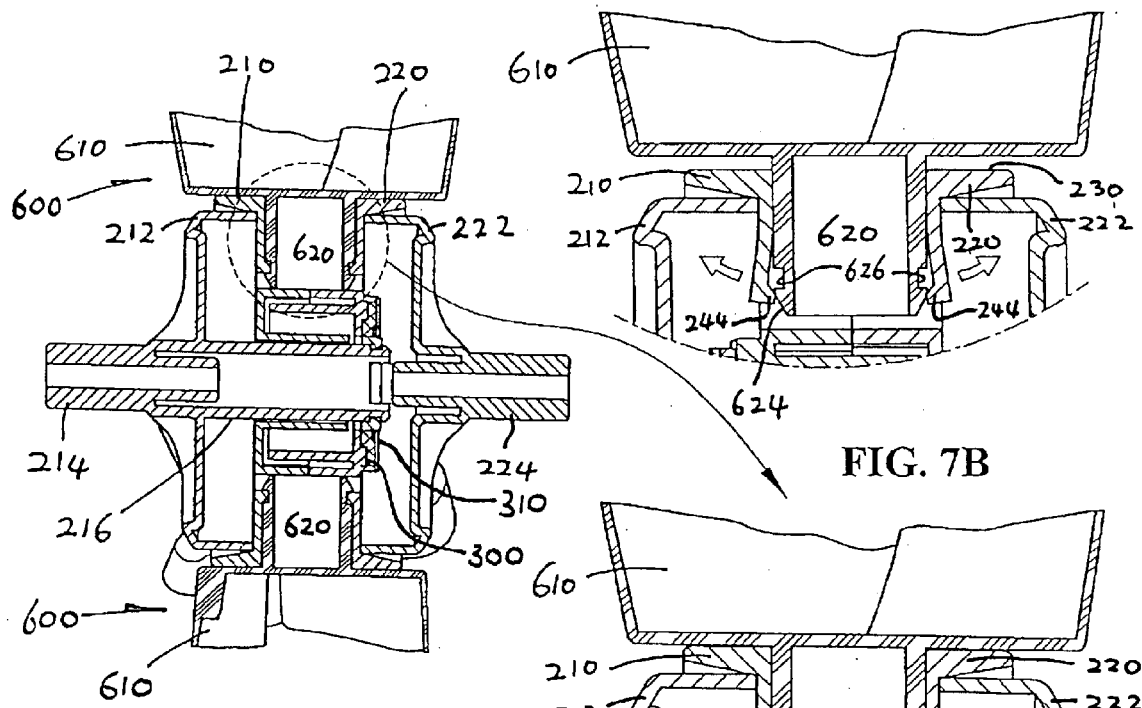
FIG. 7B
FIG. 6
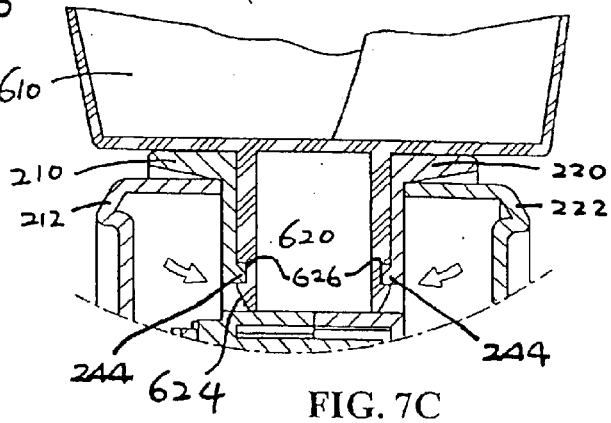
FIG. 7C

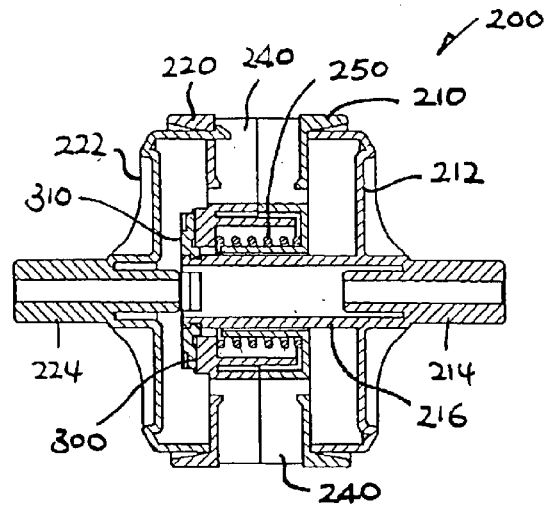
FIG. 8B
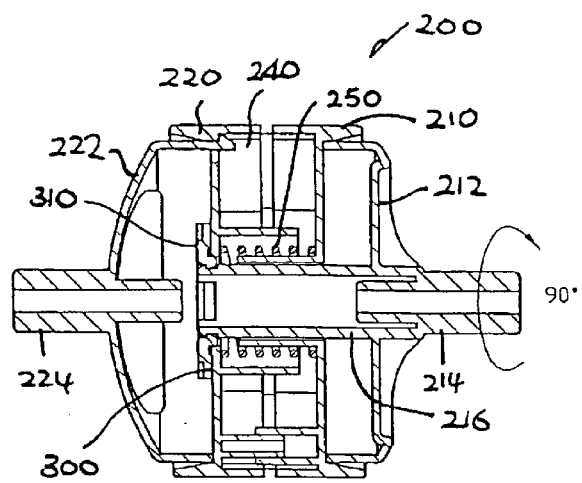
FIG. 9B
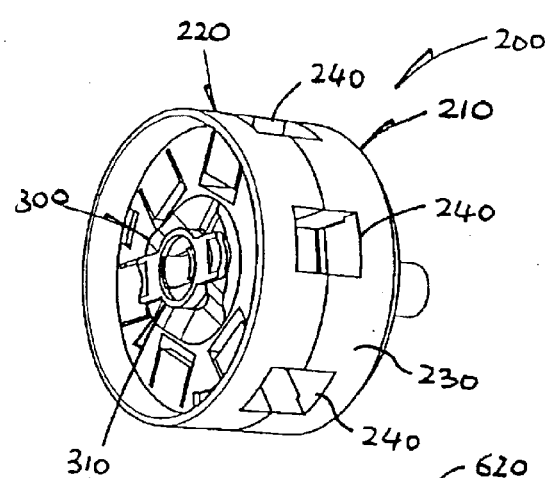
FIG. 8A
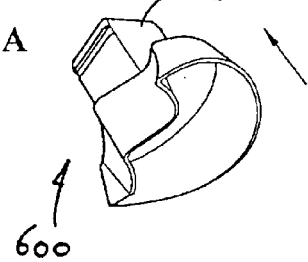
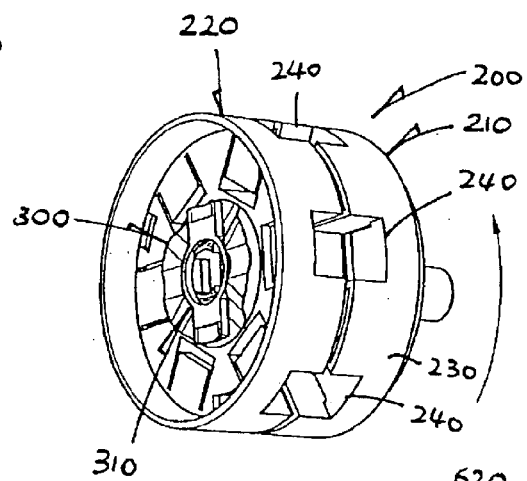
FIG. 9A
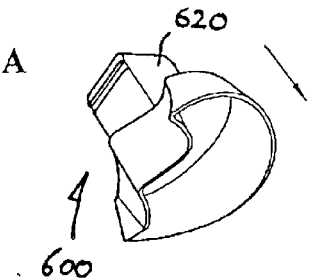

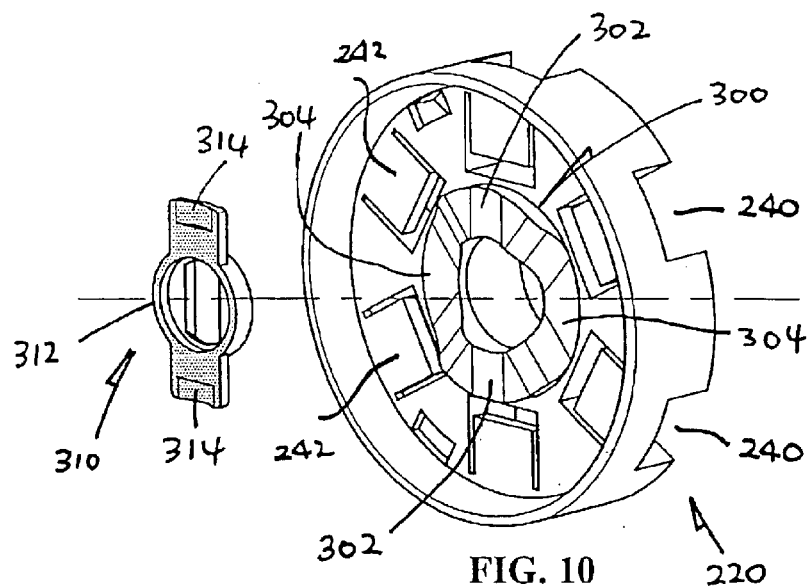
FIG. 10
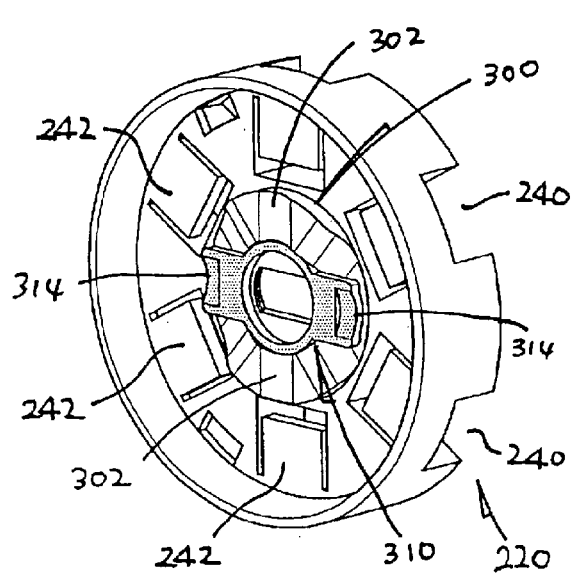
FIG. 10B
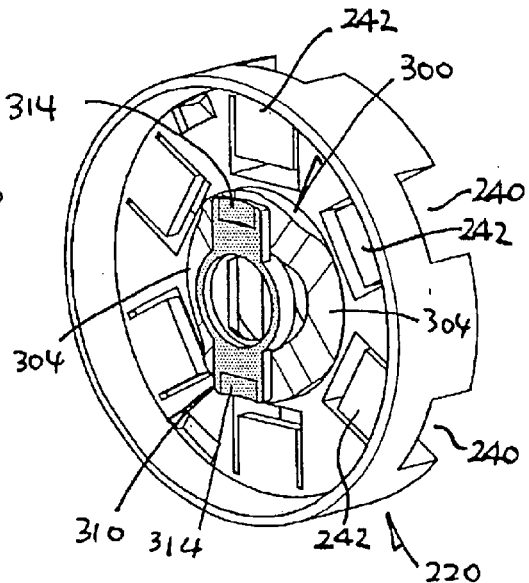
FIG. 10A
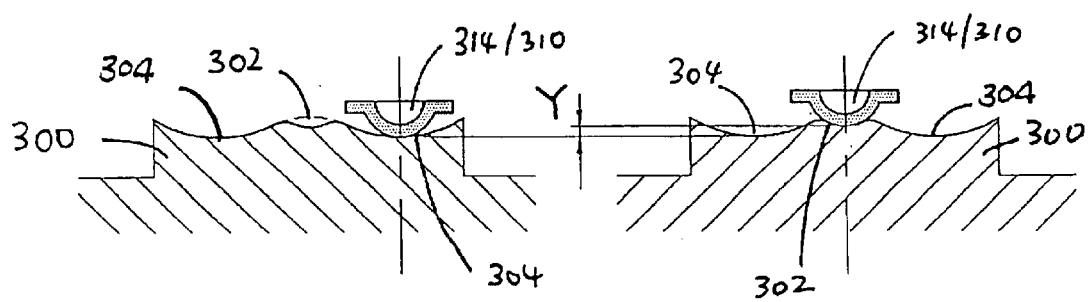
FIG. 10BB
FIG. 10AA

PASTRY CUTTER

BACKGROUND OF THE INVENTION

Pastry cutters of the rotary type are generally known. In a typical construction, it comprises a rotor, a handle supporting the rotor for rotation, and a plurality of cutting moulds connected to the periphery of the rotor at equi-angular positions. Each cutting mould has a generally flat cup-shaped body which has a cutting rim and is connected to the rotor, such that the bodies lie in an annular arrangement around the rotor, with their cutting rims facing outwards for rolling on a pastry mix or dough for cutting the dough.

The subject invention seeks to provide an improved pastry cutter of this type in general.

SUMMARY OF THE INVENTION

According to the invention, there is provided a pastry cutter comprising a rotor having opposite left and right sides, a central axis through the two sides and a periphery extending around the central axis, a handle supporting the rotor for rotation about the central axis, and a plurality of cutting moulds individually connected to the periphery at substantially equi-angular positions around the central axis. Each cutting mould comprises a generally flat cup-shaped body having a cutting rim and includes a stem connecting the body to the periphery in a spaced apart relationship therefrom and in a substantially radial direction with respect to the central axis, such that the bodies lie in an annular arrangement around the rotor, with their cutting rims facing outwards. Each stem has an outer end connected to the corresponding body and an inner end releasably connected to the periphery.

Preferably, the periphery of the rotor at each of the equi-angular positions includes a recess and the inner end of the corresponding stem is inserted into the recess in a substantially radial direction and thus engaged therewith.

More preferably, the inner end of each stem has a reduced cross-section engaged substantially wholly within the corresponding recess.

It is preferred that each stem has opposite left and right sides and the corresponding recess has opposite left and right sides proximal the left and right sides of the stem respectively, at least one pair of said proximal sides including a resiliently deformable first part from one side engaged with a second part from the other side as a snap-fit.

It is further preferred that the first part is from the side of the stem and includes an indentation and the second part is from the side of the corresponding recess and includes a protrusion snap-fitted with the indentation.

In a preferred embodiment, the rotor has co-axially interconnected left and right members which are movable axially apart into an open condition and against each other into a closed condition, said members having an interface intercepting with the recesses such that the recesses are widened when the members are in the open condition to release the stems.

It is preferred that the rotor includes a spring co-acting between the first and the second rotor members for resiliently biassing the rotor towards the open condition.

Preferably, a first rotor member includes a cam follower that is rotatable relative to both members and in particular relative to the second member, and the second member includes a cam track along which the cam follower can move through rotation, the cam track having relatively higher and lower regions for the cam follower to define the two conditions of the rotor members respectively.

Conveniently, the cam track is formed integrally on the second rotor member.

Preferably, the first rotor member includes a separate shaft which extends through respective central holes of the first and then second members, and the cam follower is located at an end of the shaft on the far side of the second member to connect the second member to the first member.

More preferably, the cam track is provided on the far side of the second rotor member for supporting the cam follower at the higher region to define the closed condition of the rotor members and alternatively at the lower region to define the open condition of the rotor members.

Advantageously, the outer end of each stem is releasably connected to or detachable from the corresponding cutting mould body.

More advantageously, each stem is sufficiently short to be stored within a respective mould body.

In a specific construction, one of the outer end of each stem and a rear part of the corresponding cutting mould body is inserted laterally into the other of said outer end and rear part and thus engaged therewith.

More specifically, the outer end of each stem and the rear part of the corresponding cutting mould body are interconnected by way of a mortise-and-tenon joint.

It is preferred that the rotor and the two rotor members are each substantially cylindrical in shape.

In a specific construction, the handle has a body and a bifurcate end providing the pair of parts, and a shaft extends across the pair of parts through a central hole of the rotor and supports the rotor for rotation, and the handle body extends substantially perpendicularly to the shaft.

BRIEF DESCRIPTION OF DRAWINGS

The invention will now be more particularly described, by way of example only, with reference to the accompanying drawings, in which:

FIG. 6 is a cross-sectional view of the rotor and cutting moulds of FIG. 5;

FIGS. 7A to 7C are sequential cross-sectional views showing how a cutting mould of FIG. 6 is connected to the rotor;

FIGS. 8A and 8B are perspective view and cross-sectional view showing a closed condition of the rotor of FIG. 1;

FIGS. 9A and 9B are perspective view and cross-sectional view corresponding to FIGS. 8A and 8B, showing an open condition of the rotor;

FIG. 10 is a perspective view of parts of the rotor of FIGS. 8A, 8B, 9A and 9B, including a cam track and a cam follower;

FIGS. 10A and 10AA are perspective view and schematic track development view of the cam track and follower of FIG. 10, corresponding to the closed condition of FIGS. 8A and 8B; and FIGS. 10B and 10BB are perspective view and schematic track development view of the cam track and follower of FIG. 10, corresponding to the open condition of FIGS. 9A and 9B.

DETAILED DESCRIPTION OF PREFERRED EMBODIMENT

Figure 1:
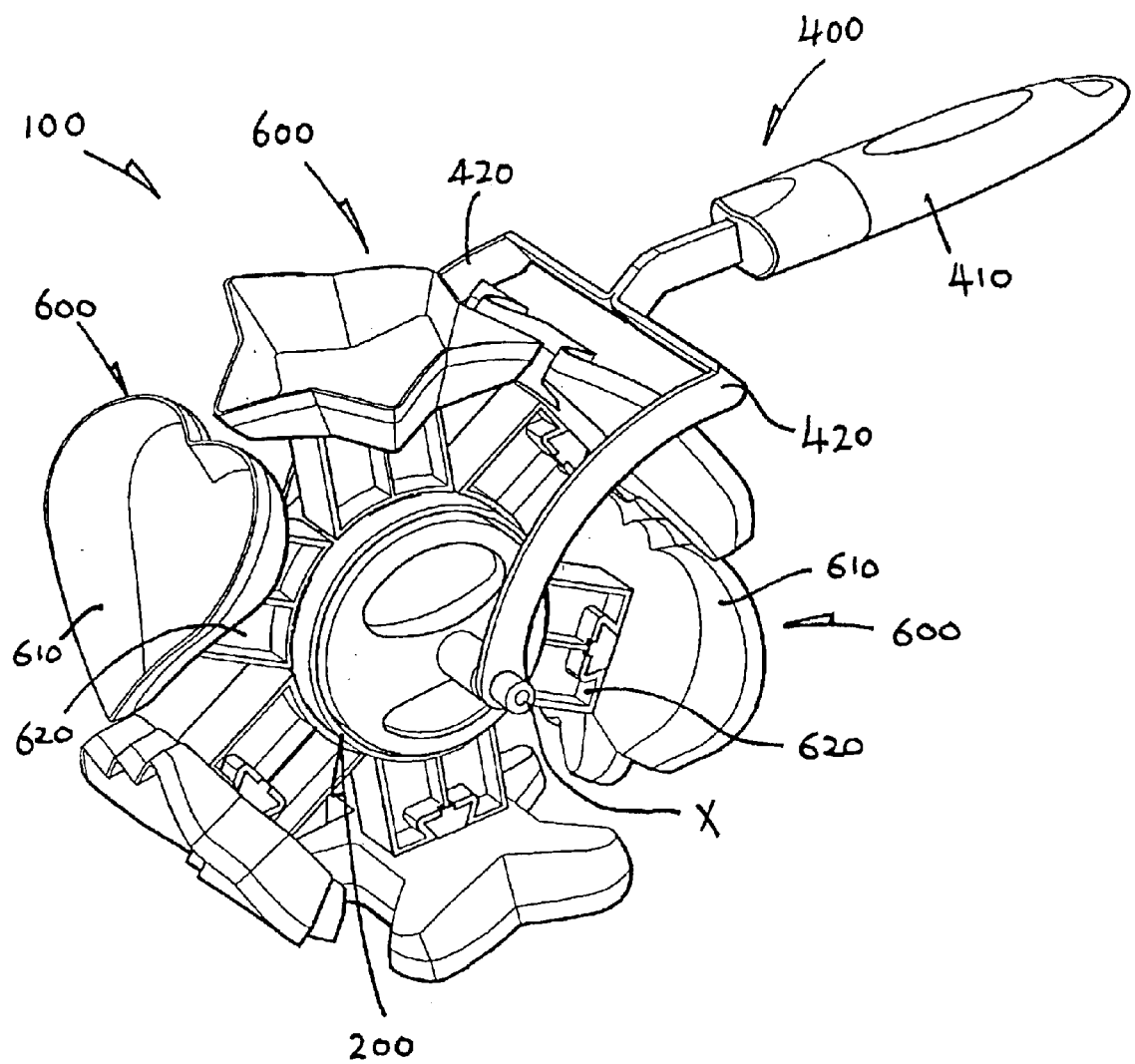
FIG. 1 is a perspective view of an embodiment of a pastry cutter in accordance with the invention, said cutter having a rotor, a handle and a number of cutting moulds.

Referring to the drawings, there is shown a pastry cutter 100 embodying the invention, which cutter 100 comprises a cylindrical rotor 200 having a central axis X, a handle 400 supporting the rotor 200 for rotation about the central axis X, and a set of six cutting moulds 600 connected to the rotor 200 at equi-angular positions about the central axis X.

The handle 400 has a body 410 and a bifurcate front end which provides a pair of left and right prongs 420 flanking the rotor 200 on opposite left and right sides thereof. A shaft 430 extends across free ends of the prongs 420 through a central hole of the rotor 200. By means of the shaft 430, the prongs 420 engage opposite sides of the rotor 200 and supports it for rotation about the central axis X. The handle body 410 extends perpendicularly to the shaft 430, generally horizontally rearwards.

The rotor 200 is formed by a pair of right and left cylindrical shells 210 and 220 which are co-axially interconnected, together sharing the central axis x and having a peripheral surface 230 that extends around the central axis X. Six recesses 240 are formed at equi-angular positions in the peripheral surface 230, each having a rectangular cross-section, for locating respective cutting moulds 600. The interface between the two shells 210 and 220 intercepts with and cuts each recess 240 centrally into left and right halves.

Each rotor shell 210/220 has an inner side castellated to form the half recesses 240 and includes an outer side which is recessed and locates therein a respective circular cover 212/222. Both covers 212 and 222 have respective integrally connected outer central tubes 214 and 224 that project outwards in opposite directions along the central axis X. The right cover 210 includes an integrally connected inner central tube 216 co-axial with the outer tube 214. The inner tube 216 extends inwards from the innermost end of the outer tube 214 through central holes of both shells 210 and 220 to reach near that of the opposite outer tube 224. The three tubes 214, 216 and 224 are in straight alignment, through all of which and hence the rotor 200 the shaft 430 extends.

The two rotor shells 210 and 220 are inter-engaged against relative rotation, but they can move axially against each other into a closed condition (FIGS. 8A and 8B) and apart from each other into an open condition (FIGS. 9A and 9B). The rotor 220 includes an internal coil spring 250 compressed between the two shells 210 and 220, thereby resiliently biassing the rotor 200 towards the closed condition. As the interface between the two shells 210 and 220 intercepts with the recesses 240, the recesses 240 are widened when the shells 210 and 220 are forced apart into the open condition.

The cover 222 is fixed to the left rotor shell 220, whereas the other cover 212 is rotatable relatively to the right rotor shell 210 and in turn the left shell 220 and its cover 222. Both covers 212 and 222 are shaped for gripping by fingers such that they can be turned relatively to each other through an angle of 90° (FIG. 9B).

The inner central tube 216 extends like a shaft through the right and then left rotor shells 210 and 220 to have its free end 218 projecting slightly beyond the far/outer side of the left shell 220. The far/outer side surface of the left shell 220 is integrally formed with an annular cam track 300 co-axially surrounding the tube end 218, and the tube end 218 locates a cam follower 310. The cam follower 310 has an elongate body 312 which is centrally snap-fit to and extends across the tube end 218, thereby anchoring the left shell 220 to right shell 210 against the action of the spring 250 between the shells 210 and 220. Also, as the tube 216 is fixed to the right shell 210 via the associated cover 212, the cam follower 310 is rotatable with the cover 212.

The cam follower includes a pair of diametrically opposite ends 314 which have respective rounded inner surfaces acting upon the cam track 300, under the action of the spring 250. The cam track 300 has a pair of diametrically opposite relatively higher regions 302 and a pair of diametrically opposite relatively lower regions 304 at right angles to the pair of higher regions 302.

When the ends 314 of the cam follower 310 are engaging the higher regions 302 of the cam track 300 (FIGS. 10A and 10AA), the cam follower 310 compresses the left rotor shell 220 against the right rotor shell 210 via the inner central tube 216 fixed to the latter. This results in the closed condition of the rotor 200.

Upon rotation of the right cover 212 through an angle of 90° in either direction, the cam follower 310 follows suit and its ends 314 turn to engage the lower regions 304 of the cam track 300 (FIGS. 10B and 10BB). As the left rotor shell 220 is effectively thinner over the lower regions 304 thereby giving rise to room (Y in FIGS. 10AA and 10BB), the left shell 220 is moved by the spring 250 upon expansion slightly apart from the right shell 210. This results in the open condition of the rotor 200, in which the recesses 240 are widened.

Each cutting mould 600 has a generally flat cup-shaped body 610 having a cutting rim 612, and includes a stem 620 projecting from the rear side of the body 610. The stem 620 connects the body 610, at its rear side, to the peripheral surface 230 of the rotor 200 in a spaced apart relationship therefrom and in a radial direction with respect to the central axis X. The six mould bodies 612 lie in an annular arrangement around the rotor 200, with their cutting rims 612 facing outwards.

Each stem 620 has an outer end 622 that is connected to the corresponding mould body 610 and an inner end 624 that is releasably connected to the rotor peripheral surface 230. The inner stem end 624 has a reduced rectangular cross-section, and is inserted into the corresponding recess 240 in a radial direction and engaged wholly within the recess 240. The inner stem end 624 is formed, on opposite left and right sides thereof, with a pair of laterally extending grooves/indentations 626.

Turning back to the recesses 240 in the rotor 200, each of them has a pair of opposed left and right rectangular side walls 242. Each of the two side walls 242 is cut on its three edges except its top edge, thereby forming a resiliently deformable tab 242 whose bottom edge can deflect outwards to a limited extent. The two bottom edges include a pair of respective horizontal protruding ribs 244 opposing each other. Each rib 244 has a chamfered upper side and a right-angled lower side.

The inner stem end 624 has a marginally smaller cross-section than the corresponding recess 240. Upon insertion into the recess 240 (FIG. 7A), the inner stem end 624 jams the bottom edges of the tabs 242 proximal on opposite sides outwards (FIG. 7B) until the grooves/indentations 626 of the former engage with the corresponding ribs 244 of the latter through a snap-fit action (FIG. 7C). This locks the stem 620 and hence the associated cutting mould 600 to the rotor 200.

As mentioned above, the recesses 240 will be widened when the rotor 200 changes from its closed condition to its open condition, thereby releasing the stems 620 and in turn the cutting moulds 600. Each stem 620 is set free as a result of the ribs 244 of the corresponding widened recess 240 disengaging from the grooves/indentations 626 of the stem 620. The cutting moulds 600 can then be detached easily, without the use of much force, whether for change, cleaning or storage.

Figure 2:
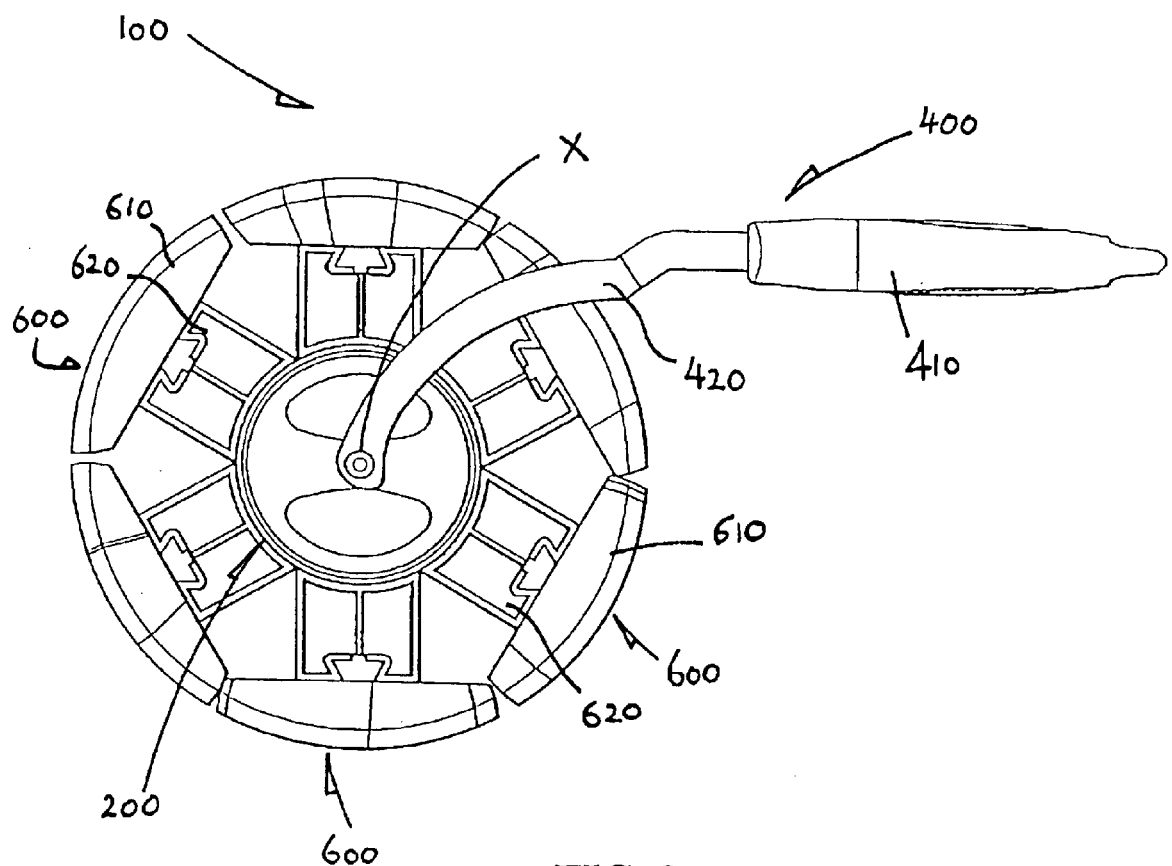
FIG. 2 is a left side view of the pastry cutter of FIG. 1.
Figure 3:
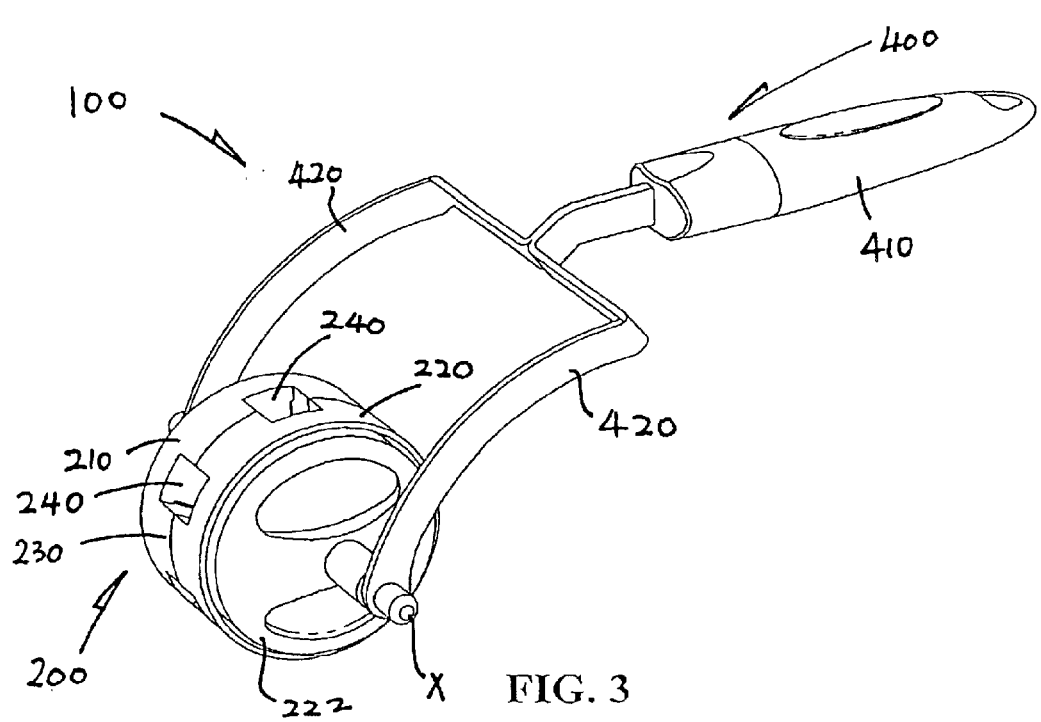
FIG. 3 is a perspective view corresponding to FIG. 1, showing the rotor and the handle.
Figure 4:
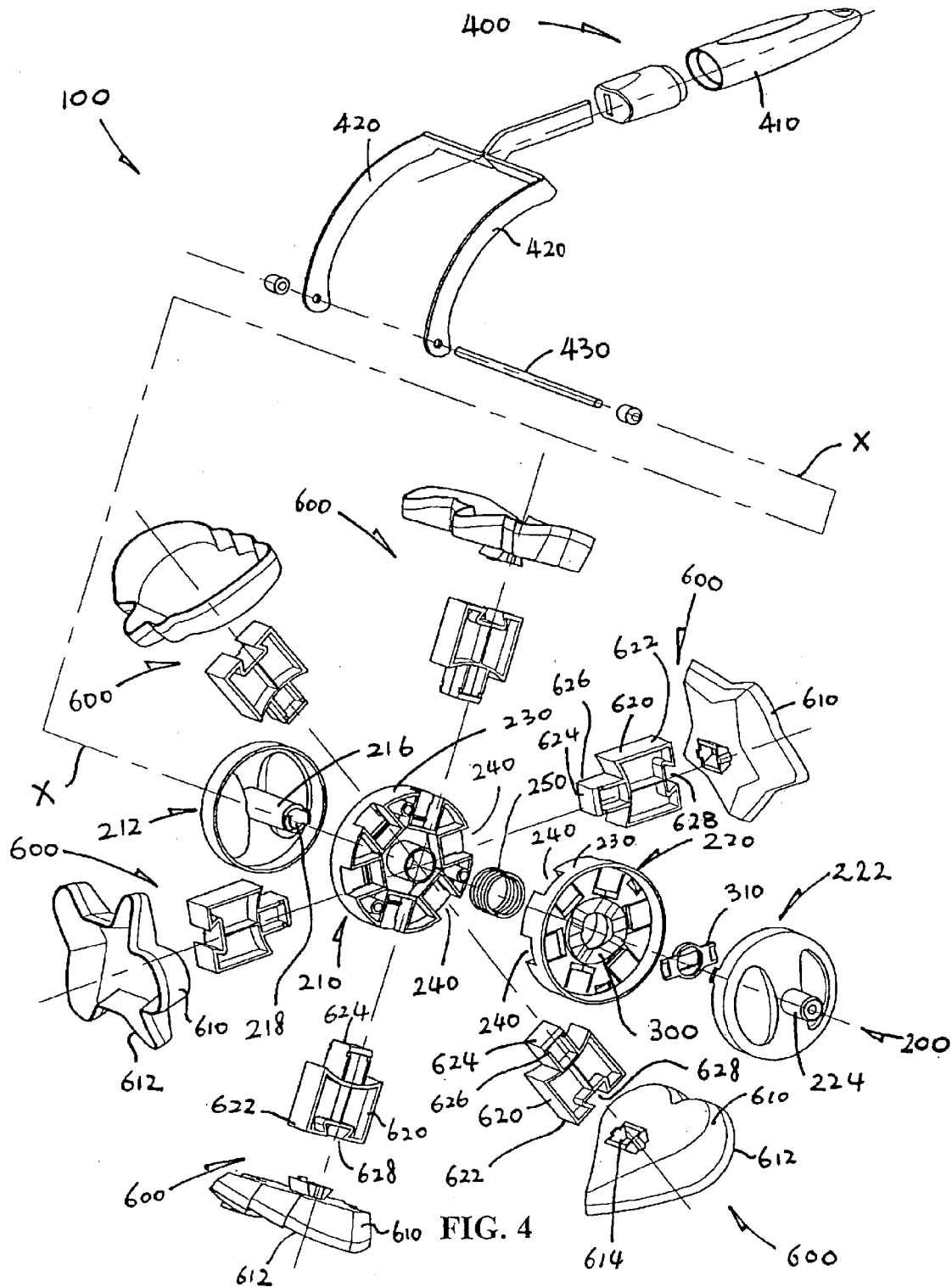
FIG. 4 is an exploded perspective view of the pastry cutter of FIG. 1.
Figure 5:
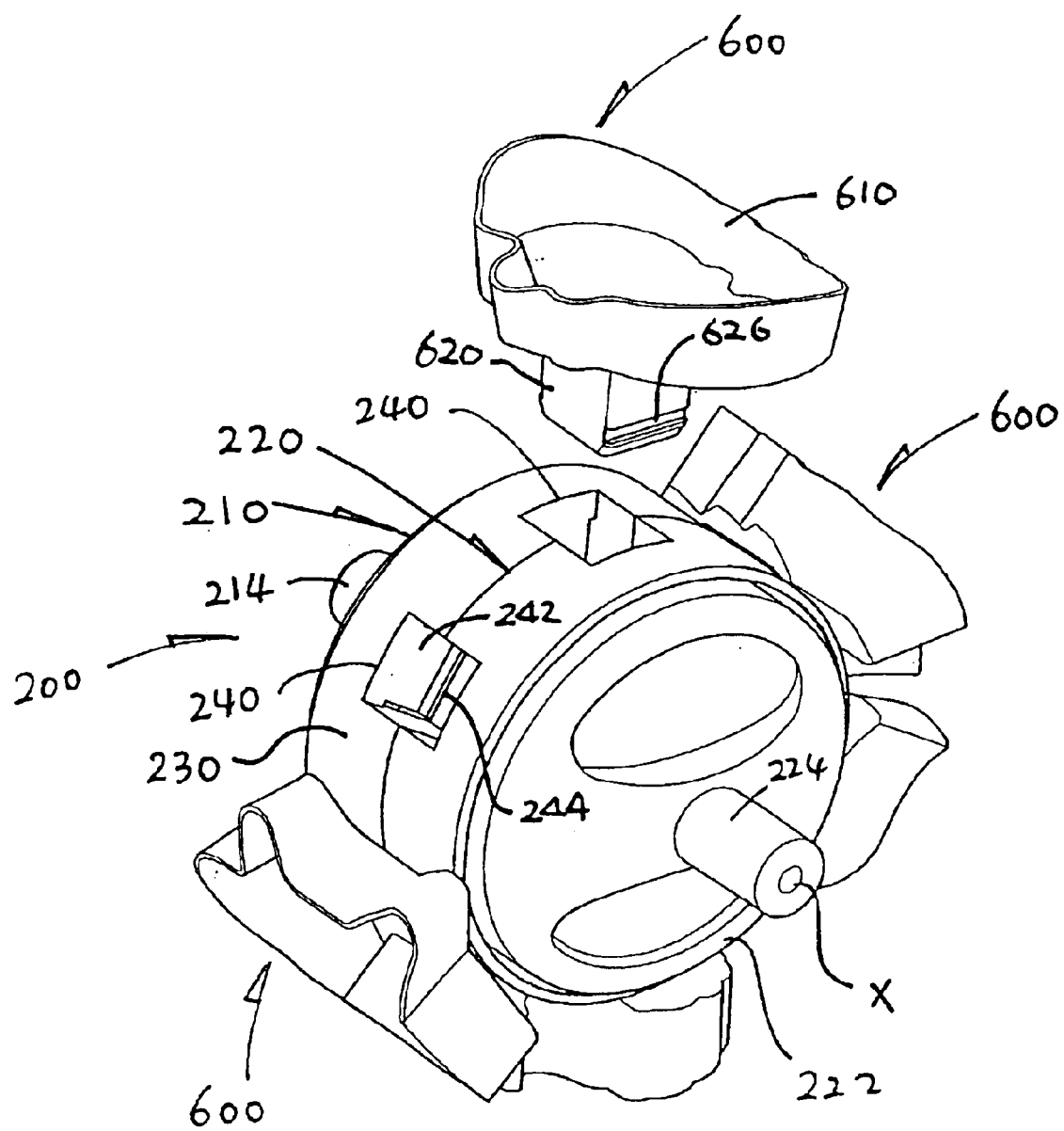
FIG. 5 is a perspective view showing the rotor of FIG. 1 and a number of different cutting moulds that are smaller.

The cutting moulds 600 are available in different shapes and/or designs of the bodies 610 or more precisely their cutting rims 612, such as heart, star and human figure as shown, for making cookies or the like of different shapes. The cutting moulds 600 come in two different sizes, i.e. the relatively larger size as shown in FIGS. 1, 2 and 4 and the relatively smaller size as shown in FIGS. 5, 6 and 7A to 7C.

In the case of the small cutting moulds 600, their stems 620 are relatively short and are integrally connected to the mould bodies 610. As the mould bodies 610 are relatively small, they should be connected fairly close to the rotor 200 to form a wheel of cutting rims 612 that is generally unbroken for smooth operation, i.e. smooth rolling on a pastry mix or dough.

For the large cutting moulds 600, their stems 620 are relatively long such that the mould bodies 610 are spaced apart from the rotor 200 to form a sufficiently large wheel. The stems 620 are they are releasably connected to the mould bodies 610 and are detachable therefrom for storage.

More specifically, the outer end 622 of each stem 620 is formed with a trapezium-shaped recess 628, and the respective mould body 610 includes on its rear side a correspondingly shaped integral connector 614. The connector 614 is inserted laterally into the recess 628 and engages therewith by friction as a mortise-and-tenon joint.

The mould bodies 610 and the stems 620 are designed such that when the stems 620 are separated, they are sufficiently short and can be placed individually within the mould bodies 610, thereby further reducing the storage space required.

The invention has been given by way of example only, and various modifications and/or variations to the described embodiment may be made by persons skilled in the art without departing from the scope of the invention as specified in the accompanying claims.

What is claimed is:

1. A pastry cutter comprising:
   a rotor having opposite left and right sides, a central axis through the two sides and a periphery extending around the central axis;
   a handle supporting the rotor for rotation about the central axis; and
   a plurality of cutting moulds individually connected to the periphery at substantially equi-angular positions around the central axis;
   wherein each cutting mould comprises a generally flat cup-shaped body having a cutting rim and includes a stem connecting the body to the periphery in a spaced apart relationship therefrom and in a substantially radial direction with respect to the central axis, such that the bodies lie in an annular arrangement around the rotor, with their cutting rims facing outwards, each said stem having an outer end connected to the corresponding body and an inner end releasably connected to the periphery,
   wherein the periphery of the rotor at each of the equi-angular positions includes a recess and the inner end of the corresponding stem is inserted into the recess in a substantially radial direction and thus engaged therewith; and,
   wherein the rotor has co-axially interconnected left and right rotor members which are movable axially apart into an open condition and against each other into a closed condition, said rotor members having an interface intercepting with the recesses such that the recesses are widened when the rotor members are in the open condition to release the stems.

2. The pastry cutter as claimed in claim 1, wherein the inner end of each stem has a reduced cross-section engaged substantially wholly within the corresponding recess.

3. The pastry cutter as claimed in claim 1, wherein each stem has opposite left and right sides and the corresponding recess has opposite left and right sides proximal the left and right sides of the stem respectively, at least one pair of said proximal sides including a resiliently deformable first part from one side engaged with a second part from the other side as a snap-fit.

4. The pastry cutter as claimed in claim 3, wherein the first part is from the side of the stem and includes an indentation and the second part is from the side of the corresponding recess and includes a protrusion snap-fitted with the indentation.

5. The pastry cutter as claimed in claim 1, wherein the rotor includes a spring co-acting between the right and the left rotor members for resiliently biasing the rotor towards the open condition.

6. The pastry cutter as claimed in claim 1, wherein one of the rotor members comprises a first rotor member including a cam follower that is rotatable relative to both rotor members, and the other of the rotor members comprises a second rotor member including a cam track along which the cam follower can move through rotation, the cam track having relatively higher and lower regions for the cam follower to define the two conditions of the rotor members respectively.

7. The pastry cutter as claimed in claim 6, wherein the cam track is formed integrally on the second rotor member.

8. The pastry cutter as claimed in claim 6, wherein the first rotor member includes a separate shaft which extends through respective central holes of the first and the second rotor members, and the cam follower is located at an end of the shaft on the far side of the second rotor member to connect the second rotor member to the first rotor member.

9. The pastry cutter as claimed in claim 8, wherein the cam track is provided on the far side of the second rotor member for supporting the cam follower at the higher region to define the closed condition of the rotor members and alternatively at the lower region to define the open condition of the rotor members.

10. The pastry cutter as claimed in claim 1, wherein the outer end of each stem is releasably connected to or detachable from the corresponding cutting mould body.

11. The pastry cutter as claimed in claim 10, wherein each stem is sufficiently short to be stored within a respective mould body.

12. The pastry cutter as claimed in claim 10, wherein one of the outer end of each stem and a rear part of the corresponding cutting mould body is inserted laterally into the other of said outer end and rear part and thus engaged therewith.

13. The pastry cutter as claimed in claim 12, wherein the outer end of each stem and the rear part of the corresponding cutting mould body are interconnected by way of a mortise-and-tenon joint.

14. The pastry cutter as claimed in claim 1, wherein the rotor is substantially cylindrical in shape.

15. The pastry cutter as claimed in claim 1, wherein the handle has a body and a bifurcate end providing the pair of parts, and a shaft extends across the pair of parts through a central hole of the rotor and supports the rotor for rotation, and the handle body extends substantially perpendicularly to the shaft.

* * * * *